United States Patent [19]
Mullen, Jr.

[11] 3,875,336
[45] Apr. 1, 1975

[54] PERIODIC SIGNAL DETECTOR

[75] Inventor: Walter W. Mullen, Jr., Lynn Haven, Fla.

[73] Assignee: The United States of America as represented by the Secretary of the Navy, Washington, D.C.

[22] Filed: Jan. 24, 1974

[21] Appl. No.: 436,306

[52] U.S. Cl. ........ 179/1.5 A, 179/1 VC, 179/1 UV, 324/76
[51] Int. Cl. ............................................ G10l 1/04
[58] Field of Search ... 179/1 SA, 1 SC, 1 SE, 1 VC, 179/100.1 VC, 1 UV; 340/8, 14; 324/77, 76

[56] References Cited
UNITED STATES PATENTS
3,688,126 8/1972 Klein.................................. 307/116
3,761,809 9/1973 Lockett et al. ...................... 324/77

OTHER PUBLICATIONS
Comer and Kawahara, "Speech Recognition Voicing Det.," IBM Tech. Disclosure Bulletin, Vol. 6, No. 10, March, 1964.

*Primary Examiner*—William C. Cooper
*Assistant Examiner*—E. S. Kemeny
*Attorney, Agent, or Firm*—Richard S. Sciascia; Don D. Doty; Harvey A. David

[57] ABSTRACT

A periodic signal detector is disclosed that may be incorporated in a voice actuated communication system. It comprises a series connected low pass filter, limiter, and bistable multivibrator, the outputs of the latter of which are connected to a pair of sweep generators. A differential comparator detects the difference in the outputs from said pair of sweep generators and uses said differences as a signal to trigger a first monostable multivibrator. A second monostable multivibrator is triggered by one of the outputs of the aforesaid bistable multivibrator. An AND gate detects the simultaneous occurrence of the outputs from said first and second monostable multivibrators and produces an output in response thereto. An averaging integrator averages the output signal from said AND gate to a more useful level before it is, in turn, used to effectively key a transmitter or some other utilization apparatus. An input utilization apparatus, such as a receiving transducer, provides the complex frequency input signal to the subject periodic signal detector, from which a predetermined frequency periodicy is to be detected thereby.

24 Claims, 3 Drawing Figures

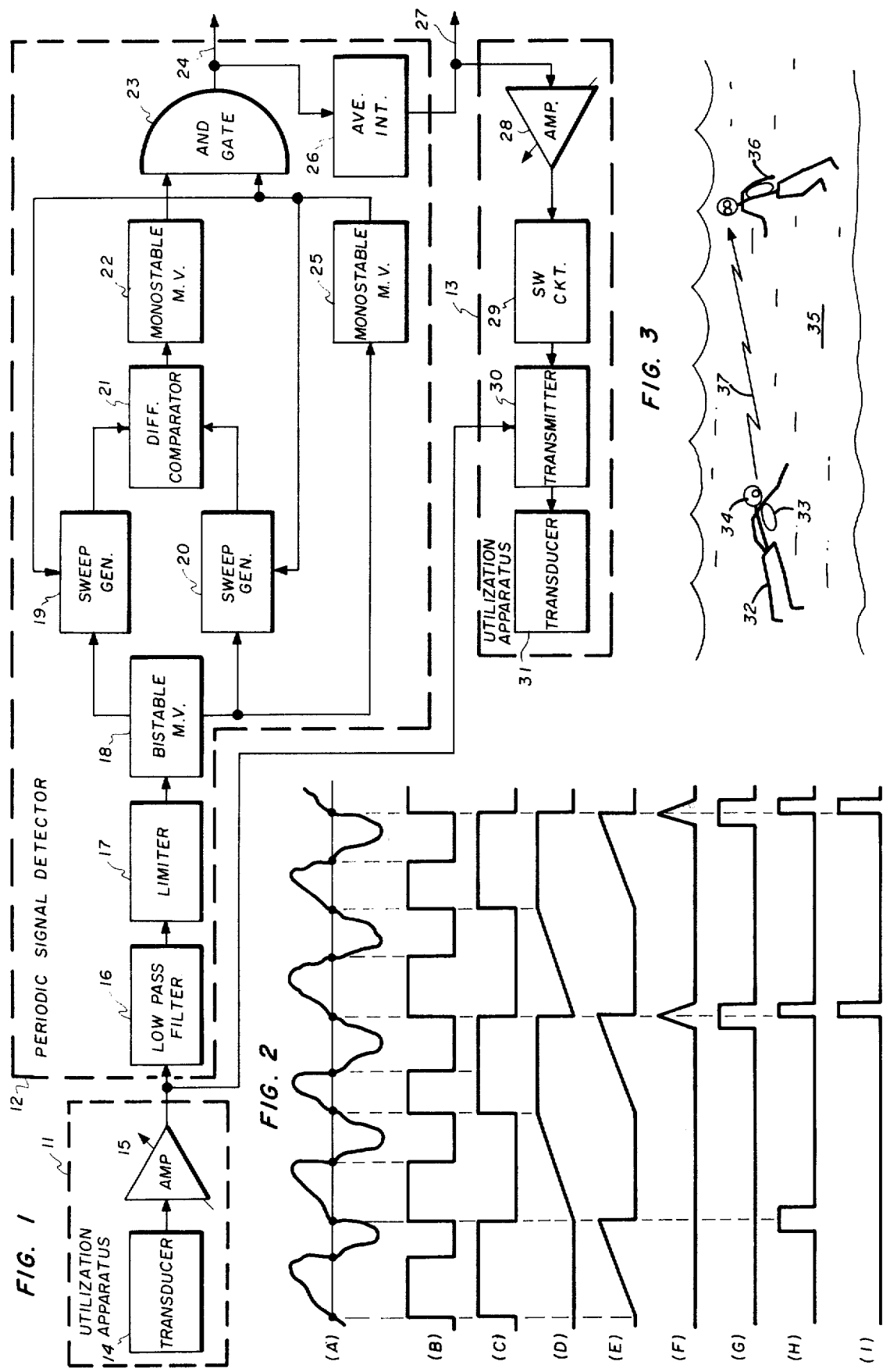

PERIODIC SIGNAL DETECTOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention, in general, relates to signal detection and, in particular, is a system for detecting signals of predetermined frequency that have a certain periodicy from within a band of frequencies, and for rejecting those signals within said band of frequencies which are random in frequency and occurrence. In even greater particularity, the subject invention is a periodic signal detector that detects certain vowel sounds in human speech and triggers a communication transmitter in response thereto.

DESCRIPTION OF THE PRIOR ART

Heretofore, voice operated transmissions of communication systems have been dependent upon sensing a certain preset energy level which is greater in amplitude than the noise associated therewith. To implement such procedure, the communication circuit involved would be preset to be actuated whenever the human speech signals supplied thereto exceeded some predetermined threshold. Although perhaps quite satisfactory for some particular operational circumstances, such systems usually left a great deal to be desired during such adverse conditions where the amplitudes of the undesirable noise signals were equal to or greater than the intelligence portions of the speech signals because the undesirable and untimely triggering of a transmitter was often times caused by said noise signals. Hence, such thresholding approach proved to be unsatisfactory in many communication situations, regardless of the ambient environmental medium within which such communication was being attempted.

When such situations as swimmers and divers attempting to talk to each other under water are involved, the noise — and, thus, signal-to-noise ratios — encountered thereby is even more severe and more deleterious to speech understanding. It, therefore, becomes very desirable to have clean, clear-cut, speech signals as the enabling signals for underwater communication systems. However, in the past, the communication systems used for such purpose were, for the most part, somewhat unsatisfactory, too, inasmuch as only vowel sounds were utilized as the initiator or operative signals. Vowel sounds usually seem to have energy concentrated in certain bands (formants). Hence, many voice operated diver communication systems of the prior art contain filter circuits that pass the energy of a cetain vowel, and the utterance of such vowel would be effective to key the transmitter. This approach was somewhat successful when a particular microphone was used in a particular location within a diver's face mask; however, when an improved gradient microphone was used in a location directly in front of a speaker's lips, the voice operated circuit was actuated — and, hence, the transmitter was triggered on — every time the speaker breathed, due to the noise generated by his breath flow across or on the microphone. To say the least, this was an untenable situation which effectively interferred and sometimes prevented good communication between underwater swimmers and divers.

Still another approach to voice operated circuits used heretofore in, say, vehicular communications, particularly military, compares the outputs of two microphones, where one thereof is a noise sensing unit and the other is a voice sensing unit. In such case, when speech sounds are present at the proper microphone, a switching circuit is energized, thereby enabling the transmitter. Such method and means are analogous to the presence of a virtual threshold which rises and falls with changes in noise level. Unfortunately, this approach is not applicable to situations where the noise ambient to the two microphones is near field, such as is the situation inside a diver's face mask, since the noise in such cases is more or less overriding, as far as the speech signals are concerned. As a result, little or no signal-to-noise improvement is effected by such arrangement.

Of course, the most conventional means employed in the past to trigger the transmitters of communications systems — regardless of type — has been the pushbutton that is connected for effecting the energization or actuation thereof whenever it is pushed by a human being. Naturally, such arrangement is quite satisfactory whenever the hands of said human being are not needed at the time of speaking for some other purpose or activity. However, if both of the hands of said human being are otherwise needed, the necessity of pushing said pushbutton thereby can present an awkward situation, indeed.

SUMMARY OF THE INVENTION

The present invention overcomes many of the disadvantages encountered in the devices of the prior art because it operates on the principle that the vowel sounds of human speech are generated by the opening and closing of the vocal cords in a periodic manner — which ostensively constitutes a unique set of operative parameters.

Of course, at the outset, it should perhaps be worthy of mention that, although the subject system is primarily intended for initiating the operation of the transmitter of underwater communications systems used by divers so that they may talk to each other, it is not limited thereto. Thus, it may readily be seen that, with proper design changes incorporated therein, it may be operated by any period input signal that is supplied thereto which is the equivalent of, similar to, or contains the aforesaid periodicy of said opening and closing vocal cords, regardless of source or ambient environment. The design and selection thereof would obviously be determined by the type of signal being monitored and perhaps other operational circumstances, as well. Of course, it would be well within the purview of the artisan having the benefit of the teachings presented herewith to make whatever design choices as are necessary to enable the instant invention to function properly during any given operational circumstances. Hence, although the preferred embodiment of the invention is herewith disclosed as being a voice operated communication system used by underwater divers and swimmers while they are working or otherwise operating within water, it should not be limited thereto.

In general, then, the invention includes an improved periodic detector that may be used to an advantage in conjunction with various and sundry input and output apparatus. But because male voices usually contain, among a complexity of frequencies, a fundamental vocal cord frequency of 120 Hz plus or minus approximately one-half octave, the invention is herein disclosed as being capable of detecting a periodic signal within such frequency range.

It is, therefore, an object of this invention to provide an improved periodic signal detector.

Another object of this invention is to provide an improved periodic detector for noise immune voice operated transmit or keying circuit (VOX).

Another object of this invention is to provide an improved method and means for detecting the periodicy of vowel sounds in human speech.

A further object of this invention is to provide an improved method and means for detecting and indicating the presence of a predetermined data signal having a given frequency periodicy from within a plurality of other signals, including random or other noise signals.

Still another object of this invention is to provide a method and means for triggering, actuating, and enabling a predetermined utilization apparatus in response to a predetermined signal.

A further object of this invention is to provide a periodic detector which will be unresponsive to random noise signals, regardless of the power level thereof.

Another object of this invention is to provide an improved method and means for distinguishing between periodic and random signals.

Another object of this invention is to provide an improved voice operated communications system.

Another object of this invention is to provide an improved communication system which is enabled by the voice of a diver or other being, rather than by the hands or other appendages thereof, thereby leaving said hands or other appendages free for doing other things.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a block diagram of the system constituting this invention;

FIG. 2 is an idealized graphical representation of the signal waveforms that emanate from the various components depicted in block form in the system of FIG. 1; and FIG. 3 is a quasi-pictorial representation of a situation in which the system of FIG. 1 may be used to an advantage.

DESCRIPTION OF THE PREFERRED EMBODIMENT

Referring now to FIG. 1, there is disclosed a utilization apparatus 11, the output of which is connected to the input of a noise immune periodic signal detector 12 and to one of the inputs — in this case, the data or intelligence signal input — of another utilization apparatus 13. The output of the aforesaid periodic signal detector 12 is connected to the trigger or enabling input of said another utilization apparatus 13.

In this particular case, utilization apparatus 11 comprises a receiving transducer 14 of the type ordinarily defined as being a microphone which is responsive to human speech signals and which converts them to electrical signals that are proportional thereto. In this particular embodiment, receiving transducer 14 is preferably located in the face mask of a diver, as will be discussed again subsequently. The output of transducer 14 is connected to an adjustable gain amplifier 15, the output of which, of course, constitutes the output of utilization apparatus 11.

The output of amplifier 15 is connected to the input of a low pass filter 16, which obviously constitutes the input of the aforementioned periodic signal detector 12. In this embodiment of the invention, low pass filter 16 should be conventionally designed to reject all signals having a frequency above 200 Hz. The output of low pass filter 16 is connected to the input of a limiter 17, the output of which is connected to the input of a bistable flip-flop or multivibrator 18.

The opposite polarity outputs of bistable multivibrator 18 are connected to the inputs of a pair of linear sweep generators 19 and 20, respectively, the outputs of which are respectively connected to the inputs of a differential comparator 21. The output of differential comparator 21 is connected to the input of a monostable multivibrator 22, and the output of monostable multivibrator 22 is connected to one of the inputs of a logic AND gate 23, the output 24 of which may, if so desired, constitute the output of the aforesaid periodic signal detector per se.

One of the outputs of bistable multivibrator 18, viz., the output connected to the input of sweep generator 20, is connected to the input of another monostable multivibrator 25, with the output thereof connected to the other input of logic AND gate 23.

As may readily be seen, the output of monostable multivibrator 25 is also connected to the reset inputs of sweep generators 19 and 20 for effecting the timely resetting thereof therewith, for reasons which will be discussed more fully subsequently.

In order to smooth the output signal from AND gate 23 to a more useful condition, the output thereof is preferably connected to the input of an averaging integrator 26, the output 27 of which may, depending on the apparatus associated with periodic signal detector 12, also constitute the output of said detector 12.

In the event it is desired to design periodic signal detector 12 to be applicable for a number of different operational situations, low pass filter 16, limiter 17, bistable multivibrator 18, sweep generators 19 and 20, monstable multivibrators 22 and 24, and integrator 25 may be made adjustable, so that the respective parameters thereof may be as versatile as warranted or required by operational circumstances.

The output of averaging integrator 26 is connected to the input of utilization apparatus 13 and, in this particular instance, to the input of an adjustable gain amplifier 28 incorporated therein. The output of adjustable gain amplifier 28 is connected to the input of switching circuit 29, the latter of which is of the type that switches a transmitter 30, to which it is connected, on and off, depending on whether or not an output signal occurs at the output of AND gate 23 averaging integrator 26. Although switching circuit 29 is disclosed herein as being a circuit that is separate and distinct from transmitter 30, it may, indeed, be an integral part thereof, if so desired. Moreover, it should be understood that in the event some other component is substituted by the artisan for transmitter 30, switching circuit 29 should be one that is properly designed to be compatible therewith, so that it may be timely triggered on or off or otherwise actuated, as necessitated by operational circumstances.

The output of transmitter 30 is connected to the input of a transmitting electroacoustical transducer 31, which, of course, in this particular embodiment, is of the type that broadcasts acoustical energy throughout a subaqueous medium for diver communication purposes.

As may readily be seen, amplifier 28, switching circuit 29, transmitter 30, and transducer 31, in this particular case, constitute the aforementioned utilization apparatus 13; however, for purposes of emphasis, it is again herewith indicated that any other suitable utilization apparatus requiring that an enabling signal be supplied thereto may be substituted therefor without violating the spirit and scope of this invention.

Since the preferred embodiment depicted in FIG. 1 is intended to be a voice actuated communication system of the type that can be used to an advantage by swimmers and divers, it becomes necessary for the complex speech to be broadcast by transmitting transducer 31, once it has been spoken into receiving transducer 14. Therefore, the output of amplifier 15 is electrically connected to the data or speech processing input of transmitter 30, so that the broadcast thereof will be effected simultaneously with the occurrence of the actuation supplied to amplifier 28 by averaging integrator 26 of periodic signal detector 12.

Obviously, if some other utilization apparatus is being substituted for that illustrated as utilization apparatus 13, the aforesaid electrical connection between the output of amplifier 15 and the speech input of transmitter 30 may or may not be necessary.

At this time, it would perhaps be worthy of note that all of the components shown in block form in the system of FIG. 1 are well known, conventional, and commercially available per se. Therefore, it should be understood that it is their new and unusual interconnections and interactions that constitute the subject invention and causes it to produce the unique results stated and implied above.

As previously indicated, the various and sundry signal waveforms of FIG. 2 are idealized representations of those occurring at the inputs and outputs of the various and sundry components of the system of FIG. 1, respectively. Hence, they will be discussed more fully during the discussion of the mode of operation of the invention presented below.

MODE OF OPERATION

Referring now to FIG. 3, a typical mode of operation of the invention is illustrated as including a first swimmer 32 who is carrying the subject invention 33 — with receiving transducer 14 within face mask 34 — while swimming within water 35 and communicating with another swimmer 36 by means of speech signals 37, which were broadcast as a result of swimmer 32 talking into said microphone or transducer 14 of FIG. 1. Of course, as previously indicated, microphone 14 is, in this particular instance, preferably located in the face mask of swimmer 32 and, thus, it and the associated transmission apparatus are enabled by the voice thereof.

As also previously suggested, the vowel sounds of the human speech are generated as a result of the opening and closing of the speaker's vocal cords in periodic manners, respectively, and male voices generally have a fundamental vocal cord frequency of 120 Hz plus or minus one-half octave. Of course, female voices also have their own fundamental vocal cord frequencies for which the subject system may be designed, but for the purpose of keeping this disclosure as simple as possible, the aforesaid male frequencies will be used in this brief discussion of the operation of the invention.

Assuming the exemplary communication of FIG. 3, the electrical equivalent of the talker's speech signal is effectively supplied by transducer 14 to low pass filter 16 of periodic signal detector 12. Since low pass filter 16 has been designed to reject all frequencies above 200 Hz, said speech signals may acquire the appearance of the waveform shown in FIG. 2(A) at the output thereof. This filtered signal is then converted to a squarewave signal similar to that shown in FIG. 2(B) by limiter 17. The output of limiter 17 triggers bistable multivibrator 18 each time limiter 17 changes state in the same direction, to thereby cause a signal similar to that shown in FIG. 2(C) to be generated at the output thereof. One of linear sweep generators 19 or 20 is started each time bistable multivibrator 18 changes state. This is due to the fact that said sweep generators 19 and 20 are fed from opposite sides (or polarities) of bistable multivibrator 18, thereby causing each one thereof to alternate with the other and sweep every other state change of bistable multivibrator 18.

Assume, for instance, that bistable multivibrator 18 changes state in such manner that it causes sweep generator 19 to start sweeping as shown in the waveform of FIG. 2(D). Then, at the next change of state of bistable multivibrator 18, generator 19 stops sweeping and holds the voltage level it has reached (see FIG. 2(D) again), while generator 20 begins sweeping, so as to cause the signal waveform of FIG. 2(E) to be produced at the output thereof. The two sweep voltages — that is, the signals of FIG. 2(D) and FIG. 2(E) — are both fed to differential comparator 21. As long as the sweep voltages thereof are different, the output of differential comparator 21 is either high or low; but when said sweep voltages pass through equality, differential comparator 21 makes a transition from one voltage level to another, thereby triggering the pulses shown in FIG. 2(F).

In this particular preferred embodiment, the circuit arrangement has been designed such that as the sweep of sweep generator 20 reaches the level of the sweep of sweep generator 19 from having been less, then the transition in the output signal (see FIG. 2(F) again) from differential comparator 21 is of the proper polarity to trigger monostable multivibrator 22, thereby producing a signal similar to that of FIG. 2 (G) at the output thereof.

Monostable multivibrator 25 should be designed to be triggered whenever bistable multivibrator 18 switches to the state which causes generator 19 to begin sweeping, so as to cause it to produce a signal similar to that of FIG. 2(H) at the output thereof.

The outputs of monostable multivibrators 22 and 25 are respectively fed to the inputs of logic AND gate 23, which, in turn, produces an output signal similar to that shown in FIG. 2(I) whenever the output signals from monostable multivibrators 22 and 25 are present simultaneously.

Of course, as may readily be seen from FIG. 1, the output signal — that is, the pulses of the signal waveform of FIG. 2(G) — also timely resets the aforementioned sweep generators 19 and 20.

Now let it be assumed that the input signal to periodic signal detector 12 is a periodic signal because it contains some male voice vowels. Then, the output of bistable multivibrator 18 is also periodic, with the duration of each half cycle thereof equal to one period of the incoming signal. When generator 19 sweeps, it will attain and hold a voltage level that is directly proportional to the interval of time it sweeps (see FIG. 2(D)), and the same thing occurs for sweep generator 20 (see FIG. 2(E)). Since the sweeping intervals are equal — due to the periodicy of the input signal — the voltage levels become equal at the end of one cycle of bistable multivibrator 18. Therefore, the transition of differential comparator 21 occurs (see FIG. 2(F), triggering monostable multivibrator 22, so as to produce pulses similar to those of FIG. 2(G), and coinciding with the triggering of monostable multivibrator 25, thereby causing an output signal similar to that of FIG. 2(H) to occur of the output thereof. Of course, because of the simultaneous occurrence of the output signals from multivibrator 22 and 25, AND gate 23 is enabled and produces an output signal similar to that illustrated in FIG. 2(I).

The foregoing cycle is repeated for as long as the incoming signal to periodic signal detector 12 remains periodic; however, a different situation exists if it is not periodic, as will now be seen.

In the event the incoming signal to periodic detector is not periodic — as in the case where the diver is making some noise by breathing, rather than talking — then sweep generators 19 and 20 will attain equal levels only very rarely by chance, if at all. Even then, such occasional equalities are not sufficient to produce any effects that are deleterious to diver communication nor diver covertness, if that is desired, since only an instantaneous breathing noise of unintelligible character would be broadcast as a result thereof.

The average value of AND gate 23 output signals may be used to an advantage to key any utilization apparatus 13 or effectively key communication transmitter 27 whenever it is high, due to its repeated occurrence at regular intervals; but when the input signal is not periodic, the average output from AND gate 23 is too low therefor, due to the occurrence of only occasional output signals at random intervals. Of course, integrator 26 performs the averaging (and, thus, the smoothing) of the output from AND gate 23 in this case. In the alternative, however, other types of integration, or such other processing as thresholding, or the like, may be employed to prevent the possibility of occasional random or other signals from adversely becoming operative as the keying signal, as far as said utilization apparatus is concerned.

The aforesaid monostable multivibrators 22 and 25 are preferably designed in such manner that the duration of the output signals therefrom are approximately in order of magnitude less than the expected average period of the input signal of periodic signal detector 12, so as to produce rather narrow limits within which the period of any given cycle of input signal must equal the period of the following cycle thereof. The output duration of monostable multivibrator 22 should be made slightly longer than that of monostable multivibrator 25, so that the triggering of the former will occur prior to the resetting of the sweeps of both of the aforesaid sweep generators 19 and 20, but still remain in existence until the end of the output signal from the latter. Within limits, if so desired, the period of the input signal to detector 12 may be variable, since the sweep voltage levels attained by sweep generators 19 and 20 are greater or less, respectively, as the input signal period is longer or shorter, as long as they are still equal for the same time intervals.

In addition, if so desired, the subject invention may be so designed as to readily accommodate a two-to-one range in periods (one octave in frequency). In such case, sweep generators 19 and 20 are adjusted to attain an output voltage level of about one-half the maximum possible voltage level when the incoming signal is of the average expected period. So doing thus allows the sweeps of sweep generators 19 and 20 to be greater or less in voltage level than the average.

An alternate method of and means for implementation of the above described embodiment of the invention would be to replace the aforementioned sweep generators with digital counters which would count the cycles of a reference clock. In such case, the count during one period would be compared to the count during the following or succeeding period and an output signal would be produced at the output of the comparator if the counts agreed in number within some preset limit.

From the foregoing, it may readily be seen that diver communication is more expeditiously accomplished because the transmitter employed therefor is keyed and, thus, enabled to an operational condition by the periodicity of the vowel sounds in the diver's voice while he is speaking, say, to another diver (as disclosed, for example in FIG. 3), inasmuch as such voice operated circuit (VOX) allows the diver's hands to remain free for other than transmitter keying activities. Moreover, the subject periodic signal detector incorporated in such a diver communication system, for the most part, precludes actuation or keying of said transmitter regardless of ambient noise level, as long as it is random or non-periodic, thereby effecting an exceedingly efficient and improved operation therefor.

Again, although indicated above, for the purpose of emphasis, it would appear to be noteworthy that the periodic signal detector and the principle involved therein could be applied to other than voice operated (VOX) equipment where the distinction between a periodic and random signal is required.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A periodic signal detector, comprising in combination:
   means for receiving a first signal of complex frequencies and for passing those frequencies thereof that are below a predetermined frequency as a second signal;
   means connected to the output of said receiving and passing means for converting said second signal into a third signal having a substantially square-wave configuration that is corresponding thereto;

means having an input and a pair of outputs, with the input thereof connected to the output of said converting means for alternately producing a pair of oppositely polarized fourth and fifth signals at the outputs thereof in response to the squarewave configurations of said third signal, respectively;

means connected to one of the outputs of said oppositely polarized signal producing means for generating a predetermined increasing sixth signal in response to said fourth signal;

means connected to the other of the outputs of said polarized signals producing means for generating a predetermined increasing seventh signal in response to said fifth signal;

means connected to the outputs of said sixth and seventh signal producing means for comparing the magnitudes of said sixth and seventh signals and for producing an eighth signal that is proportional to the difference therebetween;

means connected to the outputs of said sixth and seventh signals comparing means for producing a ninth signal of predetermined duration in response to said eighth signal;

means connected to the other of the outputs of the aforesaid oppositely polarized signals producing means for producing a tenth signal of predetermined duration in response to said fifth signal;

means connected to the outputs of said ninth and tenth signals producing means for producing an eleventh signal whenever said ninth and tenth signals occur simultaneously; and means connected to the output of said tenth signal producing means for timely resetting the aforesaid sixth and seventh signals producing means in response to said tenth signal.

2. The device of claim 1, wherein said means for receiving a first signal of complex frequencies and for passing those frequencies thereof that are below a predetermined frequency as a second signal comprises a low pass filter.

3. The device of claim 1, wherein said means connected to the output of said receiving and passing means for converting said second signal into a third signal having a substantially squarewave configuration that is proportional thereto comprises a limiter.

4. The device of claim 1, wherein said means having an input and a pair of outputs, with the input thereof connected to the output of said converting means for alternately producing a pair of oppositely polarized fourth and fifth signals at the outputs thereof in response to the squarewave configurations of said third signal, respectively, comprises a bistable multivibrator.

5. The device of claim 1, wherein said means connected to one of the outputs of said oppositely polarized signals producing means for generating a predetermined increasing sixth signal in response to said fourth signal comprises a sweep generator.

6. The device of claim 1, wherein said means connected to the other of the outputs of said polarized signals producing means for generating a predetermined increasing seventh signal in response to said fifth signal comprises a sweep generator.

7. The device of claim 1, wherein said means connected to the outputs of said sixth and seventh signal producing means for comparing the magnitudes of said sixth and seventh signals and for producing an eighth signal that is proportional to the difference therebetween comprises a differential comparator.

8. The device of claim 1, wherein said means connected to the outputs of said sixth and seventh signals comparing means for producing a ninth signal of predetermined duration in response to said eighth signal comprises a monostable multivibrator.

9. The device of claim 1, wherein said means connected to the other of the outputs of the aforesaid oppositely polarized signals producing means for producing a tenth signal of predetermined duration in response to said fifth signal comprises a monostable multivibrator.

10. The device of claim 1, wherein said means connected to the outputs of said ninth and tenth signals producing means for producing an eleventh signal whenever said ninth and tenth signals occur simultaneously comprises an AND gate.

11. The device of claim 1, wherein said means connected to the output of said tenth signal produing means for timely resetting the aforesaid sixth and seventh signals producing means in response to said tenth signal comprises electrical conductors.

12. The invention of claim 1, further characterized by a utilization apparatus connected to the input of said first signal receiving means for supplying said first signal thereto.

13. The invention of claim 1, further characterized by:
a receiving electroacoustical transducer adapted for receiving acoustical energy from within a predetermined environmental medium and producing an electrical signal proportional thereto at the output thereof; and
an adjustable gain amplifier connected between the output of said electroacoustical transducer and the input of said first signal receiving means.

14. The invention of claim 1, further characterized by a utilization apparatus effectively connected to the output of said eleventh signal producing means.

15. The invention of claim 1, further characterized by means connected to the output of said eleventh signal producing means for producing a twelfth signal that is the average voltage level of said eleventh signal.

16. The invention of claim 1, further characterized by a utilization apparatus connected to the output of twelfth signal producing means.

17. The invention of claim 1, further characterized by an integrator connected to the output of said eleventh signal producing means.

18. The invention of claim 17, further characterized by:
a transmitter effectively connected to the output of said integrator; and
an electroacoustical transducer connected to the output of said transmitter.

19. The invention of claim 17, further characterized by means connected to the output of said integrator for broadcasting a predetermined signal throughout a predetermined environmental medium.

20. The invention of claim 17, further characterized by a utilization apparatus connected to the output of said integrator.

21. The device of claim 20, wherein said utilization apparatus comprises:
a switching circuit effectively connected to the output of said integrator;

a transmitter having a data signal input, a keying input, and an output, with the data signal input thereof connected to the input of said low pass filter and with the keying input thereof connected to the output of said switching circuit; and a transmitting transducer connected to the output of said transmitter.

22. A periodic signal detector, comprising in combination:

a low pass filter adapted for receiving the signal containing the periodicy to be detected;

a limiter connected to the output of said low pass filter;

a bistable multivibrator having an input and a pair of outputs, with the input thereof connected to the output of said limiter;

a first sweep generator connected to one of the outputs of said bistable multivibrator;

a second sweep generator connected to the other of the outputs of said bistable multivibrator;

a differential comparator having a pair of inputs and an output, with the inputs thereof respectively connected to the outputs of said first and second sweep generators;

a first monostable multivibrator connected to the output of said differential comparator;

a second monostable multivibrator connected to the other of the outputs of the aforesaid bistable multivibrator;

an AND gate having a pair of inputs and an output, with the inputs thereof respectively connected to the outputs of the aforesaid first and second monostable multivibrators; and means connected between the output of said second monostable multivibrator and inputs of said first and second sweep generators for the timely resetting thereof.

23. The invention of claim 22, further characterized by an averaging integrator connected to the output of said AND gate.

24. The invention of claim 23, further characterized by:

a receiving transducer, with the output thereof effectively connected to the input of the aforesaid low pass filter;

a switching circuit effectively connected to the output of said averaging integrator;

a transmitter having a data signal input, a keying input, and an output, with the data signal input thereof effectively connected to the output of said receiving transducer, and with the keying input thereof connected to the output of said switching circuit; and a transmitting transducer connected to the output of said transmitter.

* * * * *